(12) United States Patent
Hwang et al.

(10) Patent No.: US 8,550,726 B2
(45) Date of Patent: Oct. 8, 2013

(54) OPTICAL TRANSCEIVER USING SINGLE-WAVELENGTH COMMUNICATION

(75) Inventors: Mi Hee Hwang, Gwangju (KR); Dong Jin Shin, Gwangju (KR); Suk Han Yun, Seoul (KR); Eun Kyo Jung, Gwangju (KR)

(73) Assignee: Optoelectronics Solution Co., Ltd., Gwangju (KR)

( * ) Notice: Subject to any disclaimer, the term of this patent is extended or adjusted under 35 U.S.C. 154(b) by 273 days.

(21) Appl. No.: 13/177,489

(22) Filed: Jul. 6, 2011

(65) Prior Publication Data

US 2012/0148257 A1 Jun. 14, 2012

(30) Foreign Application Priority Data

Dec. 14, 2010 (KR) .......................... 10-2010-0127674

(51) Int. Cl.
- *G02B 6/36* (2006.01)
- *G02B 6/26* (2006.01)
- *G02B 6/42* (2006.01)
- *H04B 10/00* (2013.01)

(52) U.S. Cl.
USPC ................ 385/92; 385/31; 398/139; 398/141

(58) Field of Classification Search
USPC ....................... 385/31, 36, 49, 88–89, 92–94; 398/136–139
See application file for complete search history.

(56) References Cited

U.S. PATENT DOCUMENTS

| | | | | |
|---|---|---|---|---|
| 6,075,635 A | * | 6/2000 | Butrie et al. | 398/139 |
| 7,281,865 B2 | * | 10/2007 | Baek et al. | 385/92 |
| 7,336,905 B2 | * | 2/2008 | Pyo et al. | 398/139 |

* cited by examiner

*Primary Examiner* — Ryan Lepisto
*Assistant Examiner* — Erin Chiem
(74) *Attorney, Agent, or Firm* — Blakely, Sokoloff, Taylor & Zafman LLP (57) ABSTRACT

Disclosed herein is a single wavelength bi-directional optical transceiver for transmitting/receiving optical signals having the same wavelength through an optical communication system. The optical transceiver includes a transmitter including an isolator and converting an external input signal into an optical transmit signal, an optical filter reflecting some of the optical transmit signal and transmitting the other of the optical transmit signal, an optical fiber transmitting the optical transmit signal transmitted by the optical filter to a counterpart optical transceiver, a receiver receiving an optical receive signal from the counterpart optical transceiver via the optical fiber, and a body enclosing a portion of the transmitter, the optical filter, a portion of the optical fiber and a portion of the receiver. An incidence angle ($\theta_2$) formed between a central axis of the transmitter and a central axis of the optical fiber is adjusted to allow the optical transmit signal to be obliquely incident into the optical fiber in order to reduce reflection of the optical transmit signal by the optical fiber without coupling with the optical fiber when the transmitter transmits the optical transmit signal to the optical fiber.

8 Claims, 10 Drawing Sheets

OPTICAL TRANSCEIVER USING SINGLE-WAVELENGTH COMMUNICATION

BACKGROUND OF THE INVENTION

1. Field of the Invention

The present invention generally relates to a single wavelength bi-directional optical transceiver including a transmitter and a receiver which have the same wavelength, and, more particularly, to a two-way single wavelength optical transceiver with a structure for avoidance or cut-off of an optical path to prevent optical signals from a transmitter from being introduced into a receiver in order to overcome a problem that the receiver detects and recognizes a signal output from the transmitter, rather than a forward signal (a signal transmitted from a counterpart optical transceiver), as a forward signal, that is, an optical crosstalk effect.

2. Description of the Related Art

In recent years, with increasing use of wired/wireless communication, faster transmission of more data has required higher capacity, lower loss and higher speed communication systems. Optical communication systems meeting these conditions have been a focus of attention.

Optical communication can be classified into a full duplex type and a bi-directional type in terms of the transmission approach employed. The bi-directional transmission type may also be subdivided into a single wavelength transmission technique and a two-wavelength transmission technique.

In use of the single wavelength transmission technique, it is necessary to employ the same optical transceiver at both ends of a communication system. Single wavelength bi-directional transmission means that data can be bi-directionally transmitted at a single wavelength on the same transmission line at once.

Figure 1:
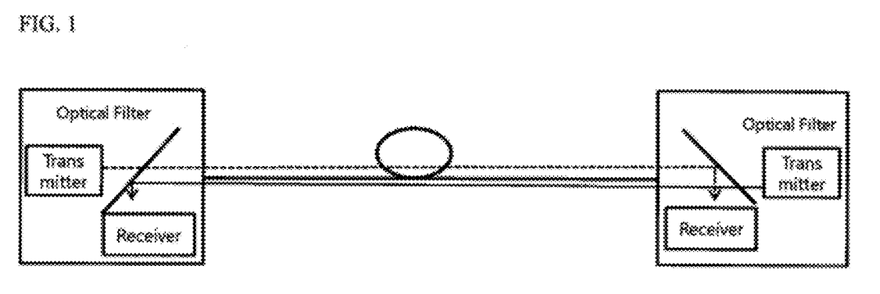
FIG. 1 is a view of a general single wavelength bi-directional transmission approach.

FIG. 1 is a view of a general single wavelength bi-directional transmission approach. As shown in FIG. 1, two single wavelength bi-directional optical transceivers are employed for the single wavelength bi-directional transmission approach. A single wavelength bi-directional optical transceiver includes a transmitter and a receiver which are integrated into a single body. In addition, use of single wavelength requires a 50:50 optical filter (or a 3 dB optical splitter) to separate one signal from another, instead of a wavelength division multiplexing filter. The single wavelength bi-directional transmission approach is more economical than other transmission approaches in terms of installation and maintenance costs because it is able to transmit data through the same optical fiber. In addition, this approach has another advantage of easy installation as a supplier and a recipient use the same wavelength and the same optical transceiver.

The single wavelength bi-directional optical transceiver is able to transmit/receive signals with the same wavelength, which requires a filter or an optical splitter having a 50%-transmission and 50%-reflection capability. As described above, when a transmitter is driven, 50% of an optical signal is transmitted while the remaining 50% is reflected. In this case, only the transmitted 50% of the optical signal acts to be coupled to an optical fiber, whereas some of the remaining reflected 50% of the optical signal is reflected and incident into a receiver. This is called an "optical crosstalk" effect wherein a forward signal is affected by such incidence of some of a signal from the transmitter into the receiver. This optical crosstalk is an important issue in a single wavelength bi-directional optical sub-assembly (BOSA) structure.

Although the single wavelength bi-directional optical transceiver is useful due to its easy installation and low maintenance costs as described above, the optical crosstalk may result in communication services with poor signal sensitivity in real world situations.

SUMMARY OF THE INVENTION

The present invention is directed to solving the problems of the related art as described above, and one aspect of the present invention is to provide a single wavelength bi-directional optical transceiver which is capable of preventing a first path of optical crosstalk of an optical transmit signal which is output from a transmitter, reflected by an optical filter, back-reflected by a body inner wall portion and incident into a receiver.

Another aspect of the present invention is to provide a single wavelength bi-directional optical transceiver which is capable of preventing a second path of optical crosstalk of an optical transmit signal which is transmitted by an optical filter, reflected by an optical filter without coupling with the optical filter, back-reflected by the optical filter and incident into a receiver.

In accordance with one aspect of the present invention, the above and other objects can be accomplished by the provision of a single wavelength bi-directional optical transceiver for transmitting/receiving optical signals having the same wavelength through an optical communication system, including: a transmitter including an isolator and converting an external input signal into an optical transmit signal; an optical filter reflecting some of the optical transmit signal and transmitting the remainder of the optical transmit signal; an optical fiber transmitting the optical transmit signal transmitted by the optical filter to a counterpart optical transceiver; a receiver receiving an optical receive signal from the counterpart optical transceiver via the optical fiber; and a body enclosing a portion of the transmitter, the optical filter, a portion of the optical fiber and a portion of the receiver, wherein an incidence angle ($\theta_2$) formed between a central axis of the transmitter and a central axis of the optical fiber is adjusted to allow the optical transmit signal to be obliquely incident into the optical fiber in order to reduce reflection of the optical transmit signal by the optical fiber without coupling with the optical fiber when the transmitter transmits the optical transmit signal to the optical fiber.

The incidence angle ($\theta_2$) of the transmitter may be determined by a core refractive index ($n_1$) and an angle ($\theta_1$) formed between a normal of a section of the optical fiber and the central axis of the optical fiber.

Assuming that the core refractive index ($n_1$) of the optical fiber is 1.4682 (at a wavelength ($\lambda$)=1550 nm), the incidence angle ($\theta_2$) of the transmitter may be 2.827° if the angle ($\theta_1$) formed between the normal of the section of the optical fiber and the central axis of the optical fiber is 6°, and 33905° if the angle ($\theta_1$) formed between the normal of the section of the optical fiber and the central axis of the optical fiber is 8°.

A section of the optical fiber may be AR (Anti-Reflective) coated to provide a high transmittance of the section which couples with the optical transmit signal.

An absorber may be formed on a reflecting point of the body to prevent the optical transmit signal from being incident into the receiver after being reflected by the optical filter and then being back-reflected by the body.

A hole may be formed on a reflecting point of the body to prevent the optical transmit signal from being incident into the receiver after being reflected by the optical filter and then being back-reflected by the body.

The absorber formed on the reflecting point may include a black epoxy resin or an absorbing structure.

A tilt angle ($\theta_3$) of the optical filter may be determined by an angle ($\theta_1$) formed between a normal of a section of the optical fiber and the central axis of the optical fiber and the incidence angle ($\theta_2$) of the transmitter, so that an amount of an optical transmit signal, which does not couple with the optical fiber and is back-reflected by the optical filter and incident into the receiver, can be minimized and the optical receive signal can be vertically incident.

The tilt angle ($\theta_3$) of the optical filter may be 46.41° if the angle ($\theta_1$) formed between the normal of the section of the optical fiber and the central axis of the optical fiber is 6°, and 45.9° if the angle ($\theta_1$) formed between the normal of the section of the optical fiber and the central axis of the optical fiber is 8°.

A tilt direction of a section of the optical fiber may coincide with a tilt direction of the optical filter so that light reflected by the optical fiber can be guided to an absorber to provide minimal reflection.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EXEMPLARY EMBODIMENTS

Exemplary embodiments will now be described in detail with reference to the accompanying drawings.

Prior to the description, configuration and operation of a general single wavelength bi-directional optical transceiver are outlined as follows with reference to the drawings. A single wavelength bi-directional optical transceiver generally includes a transmitter 10, a receiver 20, an optical filter 30, an optical fiber 40 and a body 50. Upon receiving an external signal, the transmitter 10 converts the received external signal into an optical form which is called an optical transmit signal. The transmitter 10 may include an isolator 15. In optical communications using a semiconductor laser (or TO-LD) as a light source, the isolator 15 is used to block some of the light which is emitted from the semiconductor laser light source and returned by reflection from optical parts or connectors. Typically, the transmitter 10 may be a laser diode (LD).

The receiver 20 receives an optical transmit signal transmitted from a counterpart optical transceiver and converts it into an electrical signal. Typically, the receiver 20 is a photo diode (PD). The optical filter 30 may use a 50%-transmission/50%-reflection filter or optical splitter which is able to transmit receive signals with the same wavelength. The optical fiber 40 couples with a transmitted optical transmit signal and transfers this signal to the counterpart optical transceiver. The body 50 encloses a portion of the transmitter 10, a portion of the receiver 20, the optical filter 30 and a portion of the optical fiber 40. The body 50 serves to protect elements of the optical transceiver and blocking external signals.

Optical crosstalk in a conventional single wavelength bi-directional optical transceiver may be represented by three paths as will be described below.

Figure 2:
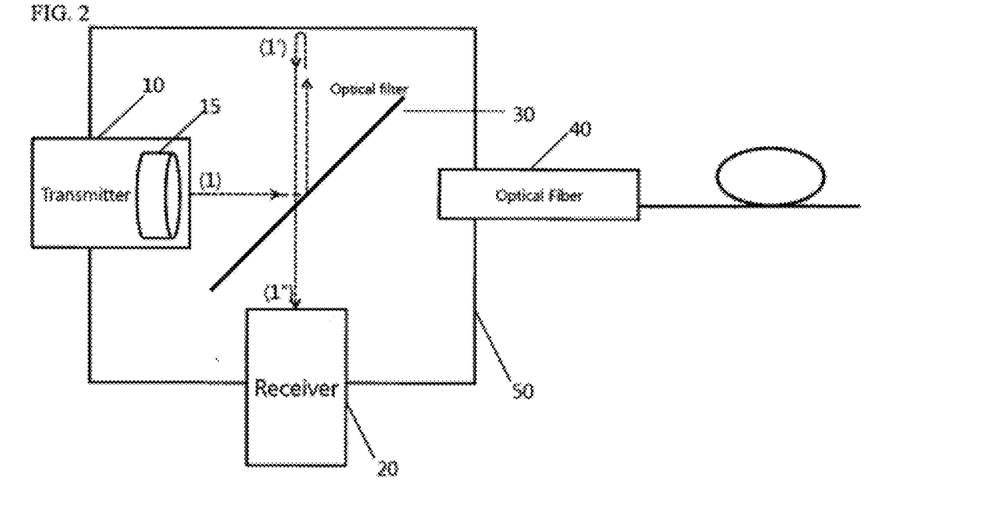
FIG. 2 is a view showing a first path of optical crosstalk in an optical transceiver employing a conventional single wavelength bi-directional transmission approach.

FIG. 2 is a view showing a first path of optical crosstalk in a conventional single wavelength bi-directional optical transceiver. As shown in FIG. 2, the first path of the optical crosstalk is produced when an optical transmit signal output from the transmitter 10 passes through the optical filter 30. The 50%-50% optical filter 30 reflects 50% of the optical transmit signal output from the transmitter 10 toward an inner wall 1' of the body 50 while transmitting the remaining 50% of the signal toward the optical fiber 40. At this time, the light reflected toward the inner wall 1' of the body 50 is back reflected from the inner wall and is incident into the receiver 20 through the optical filter 30. This route is referred to as the first path of the optical crosstalk.

Figure 3:
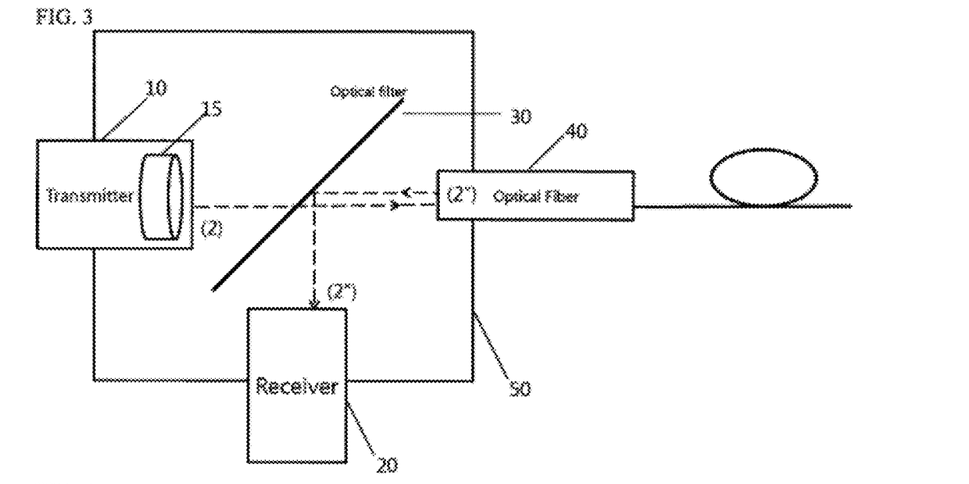
FIG. 3 is a view showing a second path of optical crosstalk in the optical transceiver employing the conventional single wavelength bi-directional transmission approach.

FIG. 3 is a view showing a second path of optical crosstalk in the conventional single wavelength bi-directional optical transceiver. As shown in FIG. 3, the second path of the optical crosstalk is produced in an optical transmit signal having passed through the optical filter 30. The optical transmit signal having passed through the optical filter 30 travels toward the optical fiber 40 and partially couples with a section 2' of the optical fiber. At this time, an uncoupled portion of the optical transmit signal is reflected toward the optical filter 30 and is back reflected by the optical filter 30 into the receiver 20. This route is referred to as the second path of optical crosstalk.

Finally, a third path of the optical crosstalk is produced in a portion of the coupled optical signal (not shown). This portion of the coupled optical signal is reflected by a connector terminal of the counterpart optical transceiver, transmitted through the optical fiber 40, and then back-reflected by the optical filter 30 into the receiver 20.

The optical crosstalk is produced by the above-mentioned optical paths. Among these, the optical crosstalk produced through the first and second paths is the primary source of signal noise. Thus, embodiments of the invention are intended to prevent signal reflection 1' by the body 50 and signal reflection 2' by the optical fiber 40 for the purpose of overcoming the first and second optical crosstalk.

Figure 4:
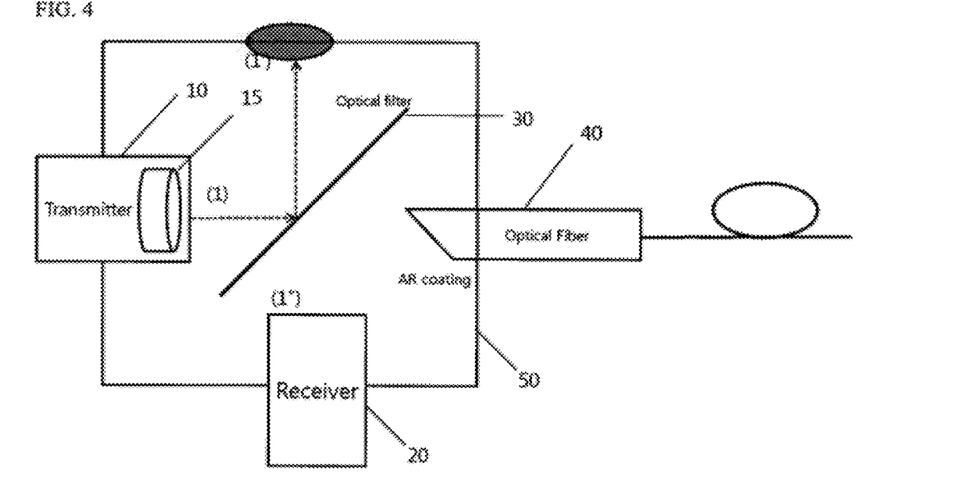
FIG. 4 is a schematic view showing prevention of a first path of optical crosstalk by a structure of a single wavelength bi-directional optical transceiver according to an embodiment of the present invention.

FIG. 4 is a schematic view showing prevention of the first path of the optical crosstalk by a structure of a single wavelength bi-directional optical transceiver according to an embodiment of the present invention. As shown in FIG. 4, the inventive single wavelength bi-directional optical transceiver employs a method of reducing an optical signal reflected by the inner wall portion 1' of the body 50 which contacts the optical transmit signal reflected by the optical filter 30, thereby eliminating the first optical crosstalk. The reduction of the reflected optical signal may be achieved by a method of using an absorber, such as epoxy resin or any absorbing structure, in the inner wall portion 1' of the body 50 to reduce an amount of the reflected optical signal or forming a groove or a hole in the inner wall portion 1' to change a path of the reflected optical signal.

Figure 5A:
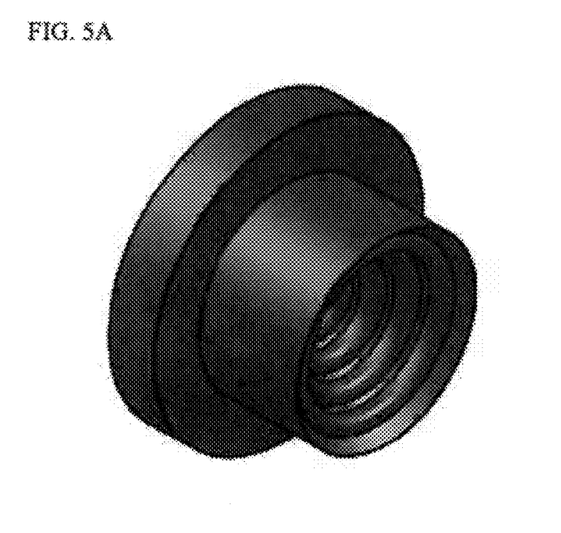
FIG. 5A is a view of an absorbing structure which can be applied to a body of the single wavelength bi-directional optical transceiver according to an embodiment of the present invention.
Figure 5B:
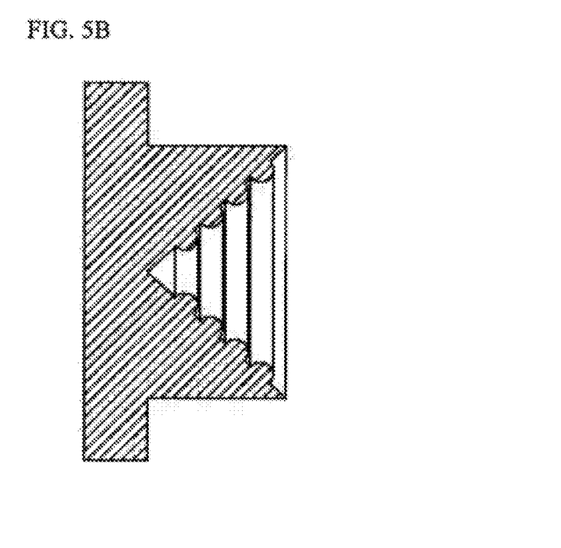
FIG. 5B is a sectional view of the absorbing structure which can be applied to the body of the single wavelength bi-directional optical transceiver according to an embodiment of the present invention.

FIG. 5A is a view showing an example of an absorbing structure which can be applied to a reflecting point of the body 50 of the inventive single wavelength bi-directional optical transceiver, and FIG. 5B is a sectional view of the absorbing structure. As shown in FIGS. 5a and 5b, the absorbing structure has a section which is inwardly stepped and tapered to prevent the optical signal from being directly reflected. In addition, edges of the inward-stepped and tapered section are rounded for diffuse reflection. It is possible to prevent back-reflection by the body by attaching or applying such an absorbing structure to the inner wall portion 1' of the body 50.

Figure 6:
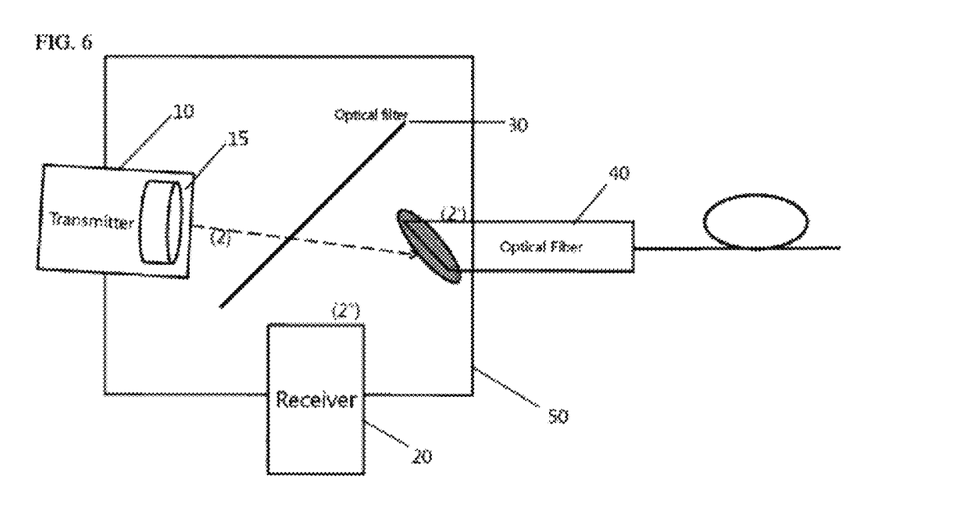
FIG. 6 is a schematic view showing prevention of a second path of the optical crosstalk by the structure of the single wavelength bi-directional optical transceiver according to an embodiment of the present invention.

FIG. 6 is a schematic view showing prevention of the second path of the optical crosstalk by the structure of the inventive single wavelength bi-directional optical transceiver. As shown in FIG. 6, the inventive single wavelength bi-directional optical transceiver employs a method of increasing coupling of an optical signal with the optical fiber 40 to eliminate the second optical crosstalk. Increasing the coupling is equivalent to reducing the optical signal reflected by the optical fiber 40. An example of the method of increasing the coupling may include forming an AR (Anti-Reflective) coating on a coupling section 2' of the optical fiber 40 in order to provide a high transmittance. In addition, an example of a method of increasing the coupling in a geometrical fashion may include changing an incidence angle $\theta_2$ (see FIG. 7) of the transmitter 10 by a certain degree.

Figure 7:
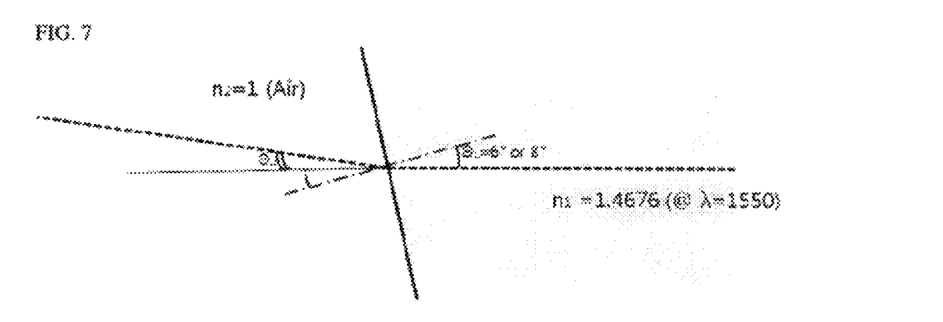
FIG. 7 is a detailed view of a contact surface between an optical transmit signal and an optical fiber in the single wavelength bi-directional optical transceiver according to an embodiment of the present invention.

FIG. 7 is a detailed view of a contact surface between the optical transmit signal and the optical fiber 40 in the inventive single wavelength bi-directional optical transceiver. As shown in FIG. 7, a section of the optical fiber 40 commonly used is cut out to be oblique by an angle of 6° to 8° to reduce Fresnel reflection. Here, assuming that an angle formed between a normal of the section of the optical fiber 40 and a central axis of the optical fiber 40 is a section angle $\theta_1$, a tilt angle $\theta_2$ of the transmitter 10 is determined by Snell's law ($n_1 \sin \theta_1 = n_2 \sin \theta_2$). That is, an incidence angle $\theta_2$ of the transmitter 10 is determined by a core refractive index $n_1$ and the section angle $\theta_1$ of the optical fiber 40. Accordingly, assuming that the core refractive index $n_1$ of the optical fiber 40 is 1.4682 (at a wavelength $\lambda$=1550 nm), the incidence angle $\theta_2$ of the transmitter 10 is 2.827° if the section angle $\theta_1$ of the optical fiber 40 is 6°, and 3.7905° if the section angle $\theta_1$ of the optical fiber 40 is 8°.

Figure 8:
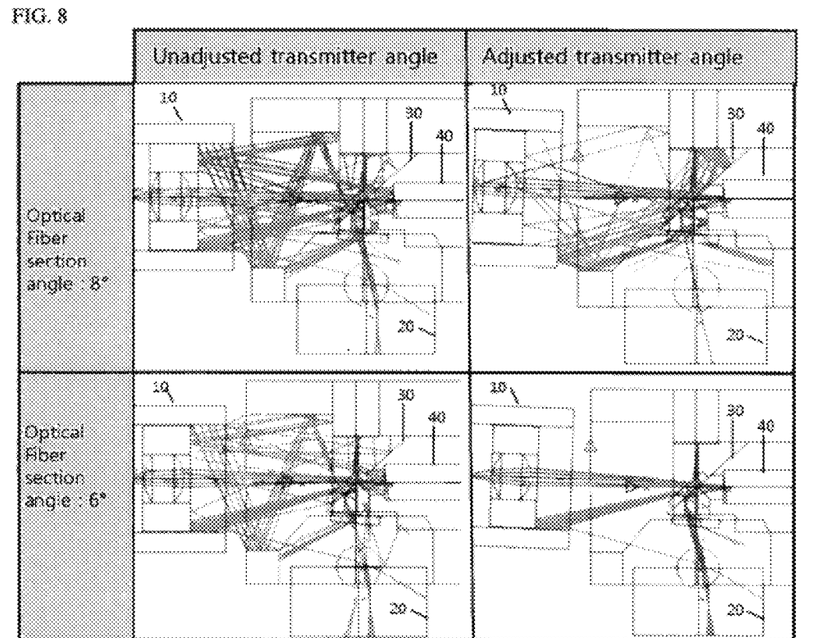
FIG. 8 is a detailed view of an optical signal reflected depending on changes of an angle of a transmitter and an angle of a section of the optical fiber in the single wavelength bi-directional optical transceiver according to an embodiment of the present invention.

FIG. 8 is a detailed view showing an optical signal reflected depending on changes in the incidence angle $\theta_2$ of the transmitter 10 and the section angle $\theta_1$ of the optical fiber 40 in the inventive single wavelength bi-directional optical transceiver. The transmitter 10 corresponds to a device placed in the left side of the device shown in FIG. 7 and the receiver 20 corresponds to a device placed under the device shown in FIG. 7. It can be seen from FIG. 8 that an amount of the optical signal which is reflected and incident into the receiver 20 is remarkably reduced when the transmitter angle $\theta_2$ is adjusted for both of section angles of 6° and 8° of the optical fiber 40. In addition, in this embodiment, it can be seen that an amount of the optical signal which is reflected and incident into the receiver 20 is minimal when the optical fiber 40 having the section angle $\theta_1$ of 8° is used and the incidence angle $\theta_2$ of the transmitter 10 is changed by a certain degree to increase coupling.

Figure 9:
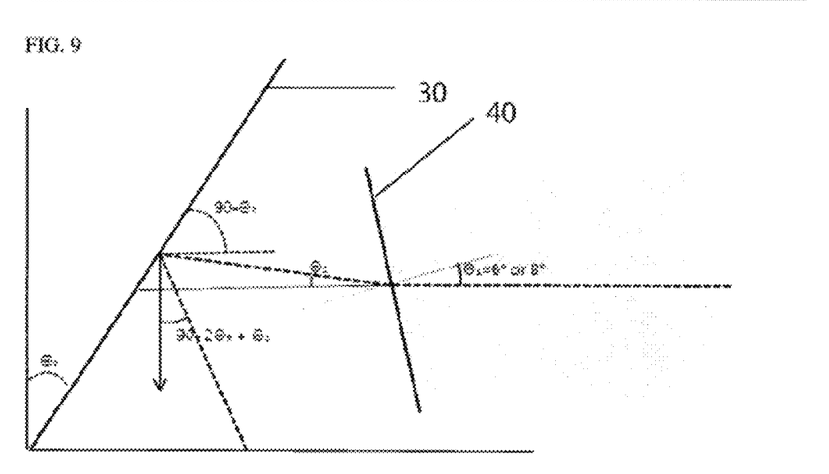
FIG. 9 is a detailed view of an optical filter and an optical fiber in a single wavelength bi-directional optical transceiver according to another embodiment of the present invention.

FIG. 9 is a detailed view showing a relationship between an optical filter 30 and an optical fiber 40 in a single wavelength bi-directional optical transceiver according to another embodiment of the present invention. As can be seen from FIG. 9, a tilt angle $\theta_3$ of the optical filter 30 is determined based on an angle formed between the optical filter 30 and a normal of the central axis of the optical fiber 40. In this embodiment, the tilt angle $\theta_3$ of the optical filter 30 typically has a range from 42° to 45° so that light output from the transmitter 10 can be received by the receiver 20 without loss.

As described above, the section angle $\theta_1$ of the optical fiber 40 may be 6° or 8°. If the section angle $\theta_1$ of the optical fiber 40 is 6°, the incidence angle $\theta_2$ of the transmitter 10 becomes 2.82°. At this time, the tilt angle $\theta_3$ of the optical filter 30 becomes 46.41" according to an equation of 90−2($\theta_3$)+2.82. To set the tilt angle $\theta_3$ of the optical filter 30 to 46.41°, an angle of a filter holder becomes 43.59° according to an equation of 90−$\theta_3$. That is, when the angle of the filter holder becomes 43.59° and thus the tilt angle $\theta_3$ of the optical filter 30 becomes 46.41°, light is incident at a right angle into the receiver 20 with minimal loss. Additionally, if the section angle $\theta_1$ of the optical fiber 40 is 8°, loss may be minimized when the tilt angle $\theta_3$ of the optical filter 30 becomes 45.9°, that is, the angle of the filter holder becomes 43.1°.

Figure 10A:
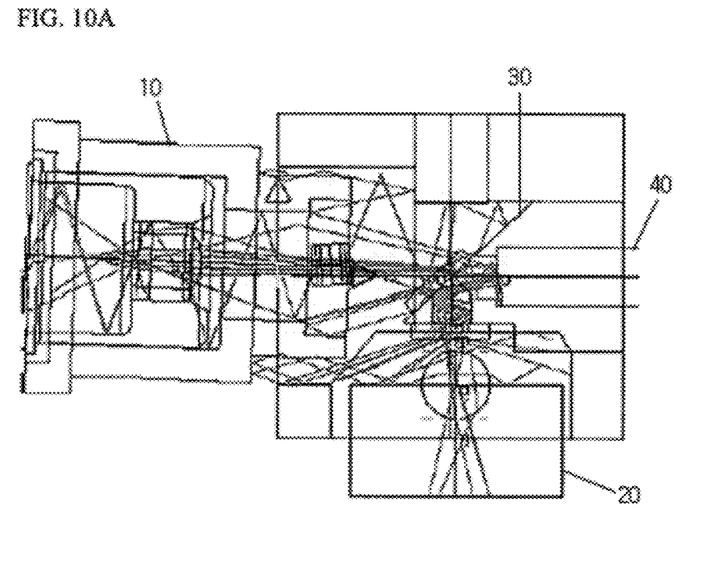
FIG. 10A is a detailed view of an optical signal reflected when a tilt angle of the optical filter of the single wavelength bi-directional optical transceiver is 47° according to an embodiment of the present invention.
Figure 10B:
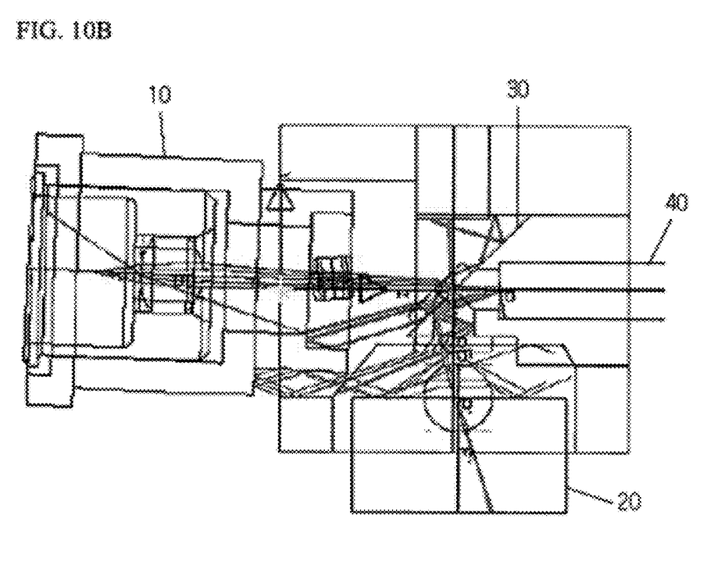
FIG. 10B is a detailed view of an optical signal reflected when the tilt angle of the optical filter of the single wavelength bi-directional optical transceiver is 45° according to another embodiment of the present invention.

FIG. 10A is a detailed view showing an optical signal reflected when the tilt angle $\theta_3$ of the optical filter 30 of the inventive single wavelength bi-directional optical transceiver is 47°, that is, the angle of the filter holder is 43°, and FIG. 10B is a detailed view showing an optical signal reflected when the tilt angle θ of the optical filter 30 is 45°, that is, the angle of the filter holder becomes 45'. From comparison of FIG. 10A with FIG. 10B, it can be seen that optical crosstalk is reduced more when the tilt angle $\theta_3$ of the optical filter 30 is 47° than when the tilt angle $\theta_3$ of the optical filter 30 is 45°. This increased reduction of the optical crosstalk is because, when the tilt angle $\theta_3$ of the optical filter 30 is 47°, output of the optical signal to be incident into the optical filter 30 is weakened as the optical signal reflected by the optical filter 30 is scattered.

Figure 11A:
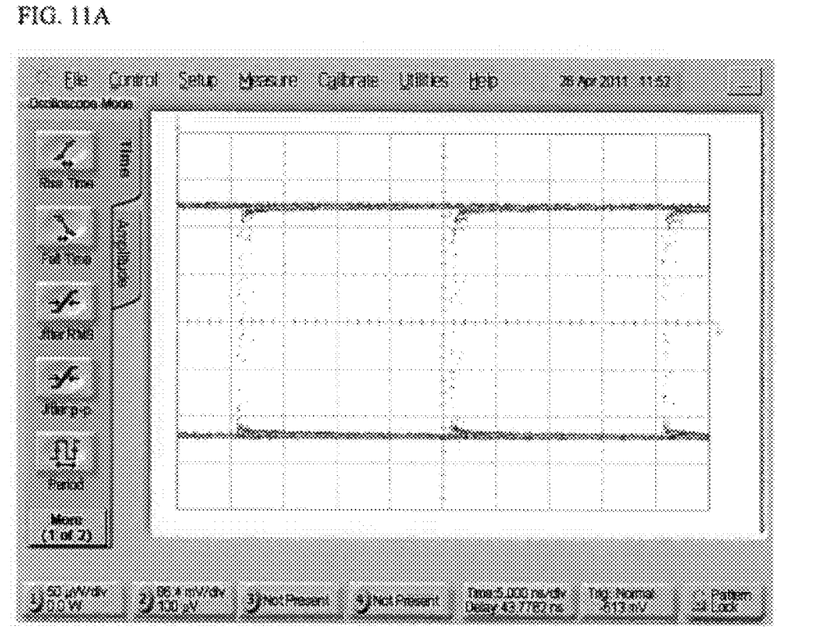
FIG. 11A is a view showing optical crosstalk produced in a conventional single wavelength bi-directional optical transceiver.
Figure 11B:
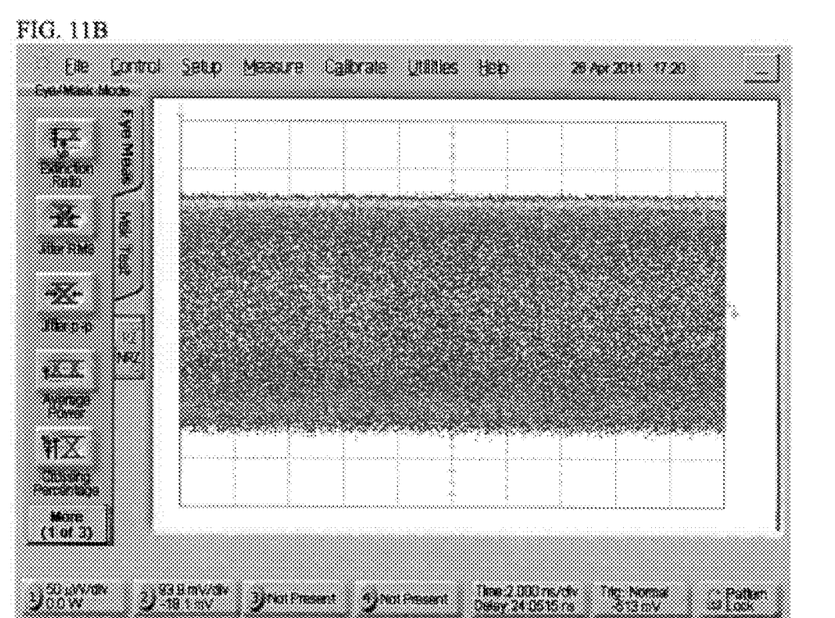
FIG. 11B is a detailed view showing that no optical crosstalk occurs in the single wavelength bi-directional optical transceiver according to an embodiment of the present invention.

FIG. 11A is a view showing optical crosstalk produced in a conventional single wavelength bi-directional optical transceiver, and FIG. 11B is a detailed view showing that there no optical crosstalk occurs in the inventive single wavelength bi-directional optical transceiver. As shown in FIGS. 11A and 11B, no optical crosstalk is produced in the inventive single wavelength bi-directional optical transceiver, whereas optical crosstalk is produced in the conventional single wavelength bi-directional optical transceiver.

Figure 12:
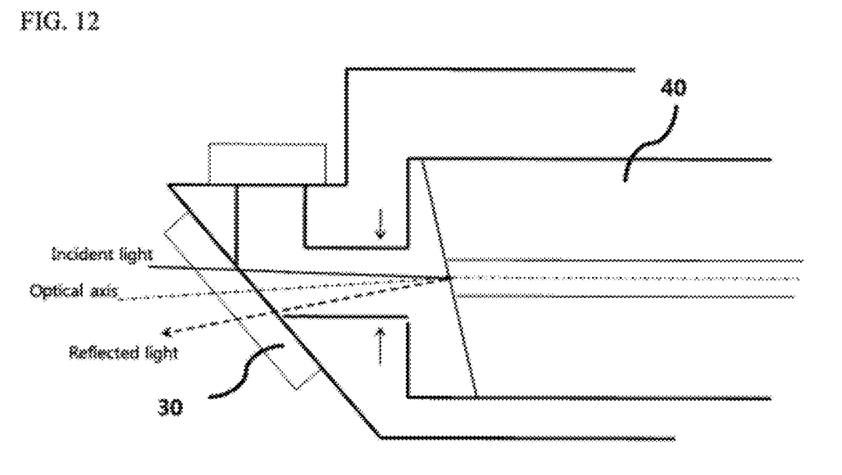
FIG. 12 is a view of a traveling path of an optical signal reflected when a tilt direction of an optical fiber is configured to be opposite to a tilt direction of an optical filter in the single wavelength bi-directional optical transceiver according to an embodiment of the present invention.

FIG. 12 is a view showing a path of an optical signal reflected when a tilt direction of the optical fiber 40 is configured to be opposite to a tilt direction of the optical filter 30 in the inventive single wavelength bi-directional optical transceiver. As can be seen from FIG. 12, light which is reflected after being incident travels toward an absorber rather than the transmitter 10 since an incidence angle of the optical signal is equal to its reflection angle with respect to a normal of the section of the optical fiber 40.

Figure 13A:
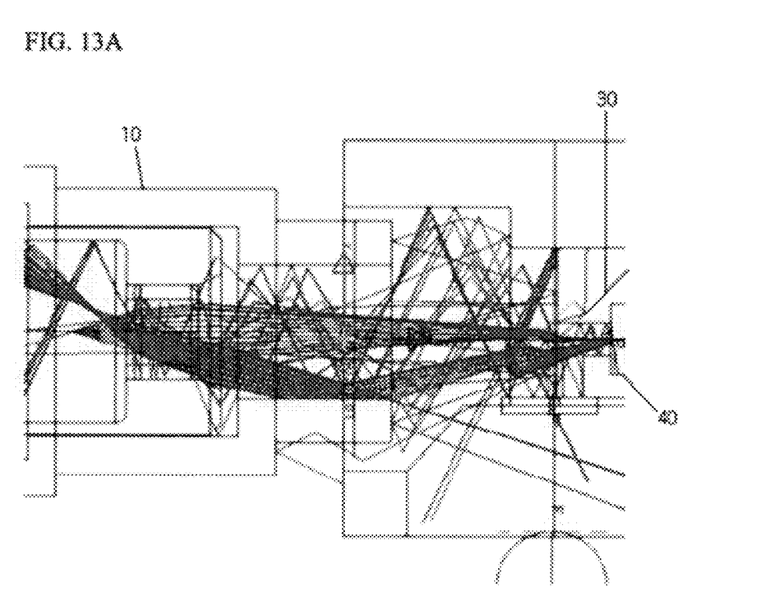
FIG. 13A is a view showing a result of an optical path tracking simulation on a general BOSA.
Figure 13B:
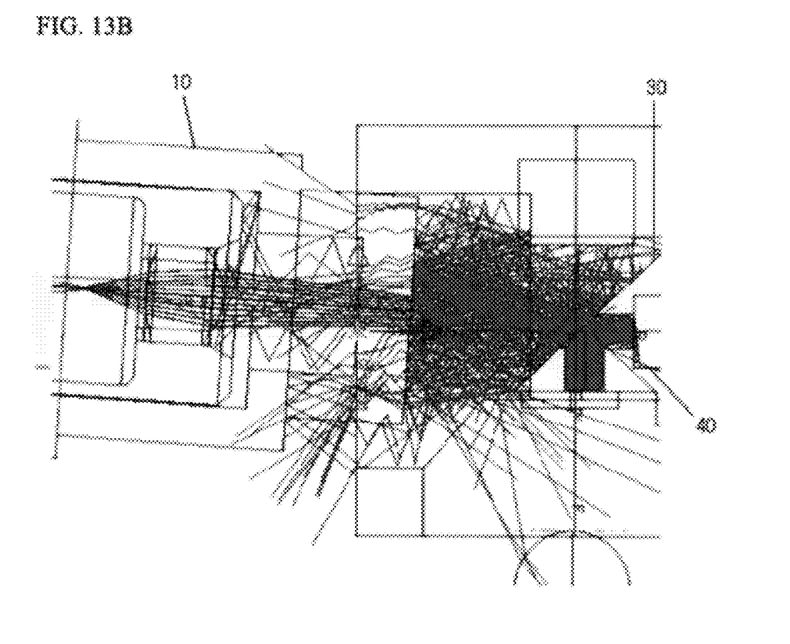
FIG. 13B is a view showing a result of an optical path tracking simulation when a tilt direction of an optical fiber is opposite to a tilt direction of an optical filter in the single wavelength bi-directional optical transceiver according to an embodiment of the present invention.
Figure 13C:
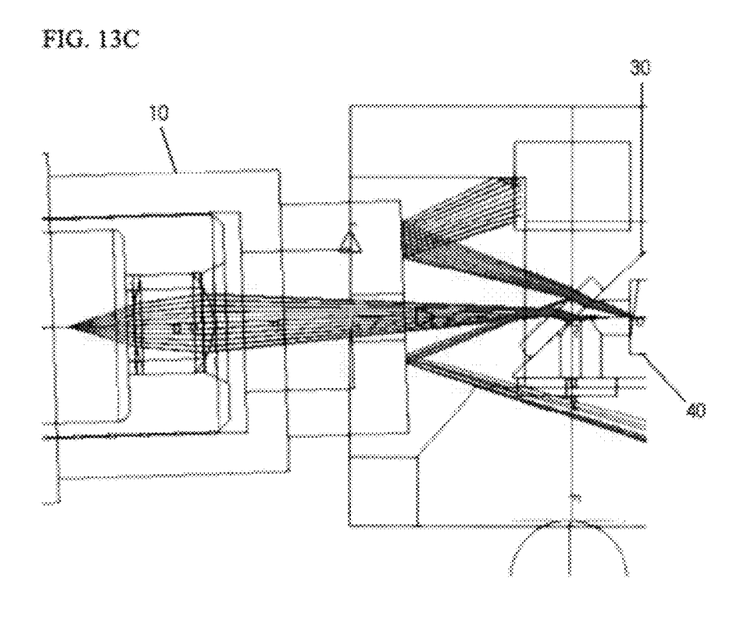
FIG. 13C is a view showing a result of an optical path tracking simulation when a tilt direction of an optical fiber coincides with a tilt direction of an optical filter in the single wavelength bi-directional optical transceiver according to an embodiment of the present invention.

FIG. 13A is a view showing a result of an optical path tracking simulation on a general BOSA, FIG. 13B is a view showing a result of an optical path tracking simulation when the tilt direction of the optical fiber 40 is opposite to the tilt direction of the optical filter 30 in the inventive single wavelength bi-directional optical transceiver, and FIG. 13C is a view showing a result of an optical path tracking simulation when the tilt direction of the optical fiber 40 coincides with the tilt direction of the optical filter 30 in the inventive single wavelength bi-directional optical transceiver. As can be seen from the simulation results, when the tilt direction of the optical fiber 40 coincides with the tilt direction of the optical filter 30, internal reflection can be reduced if a reflection path is moved toward the absorber.

According to the exemplary embodiments, the single wavelength bi-directional optical transceiver is capable of preventing a first path of an optical crosstalk of an optical transmit signal which is output from a transmitter, reflected by an optical filter, back-reflected by a body inner wall portion and incident into a receiver.

Further, according to the exemplary embodiments, the single wavelength bi-directional optical transceiver is capable of preventing a second path of optical crosstalk of an optical transmit signal which is transmitted by an optical filter, reflected by an optical filter without coupling with the optical filter, back-reflected by the optical filter and incident into a receiver.

It should be understood that the embodiments and the accompanying drawings have been described for illustrative purposes, and the present invention is limited only by the following claims. Further, those skilled in the art will appreciate that various modifications, additions and substitutions are allowed without departing from the scope and spirit of the invention according to the accompanying claims.

What is claimed is:

1. A single wavelength-bi-directional optical transceiver for transmitting/receiving optical signals having the same wavelength through an optical communication system, comprising:

a transmitter including an isolator and converting an external input signal into an optical transmit signal;

an optical filter reflecting some of the optical transmit signal and transmitting the remainder of the optical transmit signal;

an optical fiber transmitting the optical transmit signal transmitted by the optical filter to a counterpart optical transceiver;

a receiver receiving an optical receive signal from the counterpart optical transceiver via the optical fiber; and a body enclosing a portion of the transmitter, the optical filter, a portion of the optical fiber and a portion of the receiver, wherein an incidence angle ($\theta_2$) formed between a central axis of the transmitter and a central axis of the optical fiber is adjusted to allow the optical transmit signal to be obliquely incident into the optical fiber in order to reduce reflection of the optical transmit signal by the optical fiber without coupling with the optical fiber when the transmitter transmits the optical transmit signal to the optical fiber;

a tilt angle ($\theta_3$) of the optical filter is determined to be 46.41° if the angle ($\theta_1$) formed between a normal of a section of the optical fiber and the central axis of the optical fiber and the incidence angle ($\theta_2$) of the transmitter is 6°, and tilt angle ($\theta_3$) of the optical filter is determined to be 45.9° if the angle ($\theta_1$) formed between the normal of the section of the optical fiber and the central axis of the optical fiber and the incidence angle ($\theta_2$) of the transmitter is 8°, such that an amount of the optical transmit signal, which does not couple with the optical fiber and is back-reflected by the optical filter and incident into the receiver, can be minimized and the optical receive signal can be vertically incident.

2. The single wavelength bi-directional optical transceiver according to claim 1, wherein the incidence angle ($\theta_2$) of the transmitter is determined by a core refractive index ($n_1$) and an angle ($\theta_1$) formed between a normal of a section of the optical fiber and the central axis of the optical fiber.

3. The single wavelength bi-directional optical transceiver according to claim 2, wherein, assuming that the core refractive index ($n_1$) of the optical fiber is 1.4682 (at a wavelength ($\lambda$)=1550 nm), the incidence angle ($\theta_2$) of the transmitter is 2.827° if the angle ($\theta_1$) formed between the normal of the section of the optical fiber and the central axis of the optical fiber is 6°, and 3.7905° if the angle ($\theta_1$) formed between the normal of the section of the optical fiber and the central axis of the optical fiber is 8°.

4. The single wavelength bi-directional optical transceiver according to claim 1, wherein a section of the optical fiber is AR (Anti-Reflective)-coated to provide a high transmittance of the section which couples with the optical transmit signal.

5. The single wavelength bi-directional optical transceiver according to claim 1, wherein an absorber is formed on a reflecting point of the body to prevent the optical transmit signal from being incident into the receiver after being reflected by the optical filter and then being back-reflected by the body.

6. The single wavelength bi-directional optical transceiver according to claim 1, wherein a hole is formed on a reflecting point of the by to prevent the optical transmit signal from being incident into the receiver after being reflected by the optical filter and then being back-reflected by the body.

7. The single wavelength bi-directional optical transceiver according to claim 5, wherein the absorber formed on the reflecting point comprises a black epoxy resin or an absorbing structure.

8. The single wavelength bi-directional optical transceiver according to claim 1, wherein a tilt direction of a section of the optical fiber coincides with a tilt direction of the optical filter so that light reflected by the optical fiber can be guided to an absorber to provide minimal reflection.

* * * * *